US012586711B2

(12) United States Patent
Kim et al.

(10) Patent No.: US 12,586,711 B2
(45) Date of Patent: Mar. 24, 2026

(54) COIL COMPONENT

(71) Applicant: SAMSUNG ELECTRO-MECHANICS CO., LTD., Suwon-si (KR)

(72) Inventors: Hyung Ho Kim, Suwon-si (KR); Sung Jin Park, Suwon-si (KR); Jin Hwan Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 941 days.

(21) Appl. No.: 17/735,375

(22) Filed: May 3, 2022

(65) Prior Publication Data

US 2023/0054091 A1 Feb. 23, 2023

(30) Foreign Application Priority Data

Aug. 18, 2021 (KR) ........................ 10-2021-0108901

(51) Int. Cl.

*H01F 27/29* (2006.01)
*H01F 17/04* (2006.01)
*H01F 27/02* (2006.01)

(52) U.S. Cl.

CPC ........... *H01F 27/29* (2013.01); *H01F 17/045* (2013.01); *H01F 27/022* (2013.01); *H01F 2017/048* (2013.01)

(58) Field of Classification Search

CPC ...... H01F 27/29; H01F 17/045; H01F 27/022; H01F 2017/048

See application file for complete search history.

(56) References Cited

U.S. PATENT DOCUMENTS 4,498,067 A * 2/1985 Kumokawa ........... H01F 17/043 336/212
11,195,653 B2 * 12/2021 Shinohara ........... H01F 41/0246

(Continued)

FOREIGN PATENT DOCUMENTS

JP 6413096 B2 10/2018
JP 2018-182207 A 11/2018

(Continued)

OTHER PUBLICATIONS

Office Action dated Nov. 1, 2025 issued in the corresponding Korean Patent Application No. 10-2021-0108901 with the English translation.

*Primary Examiner* — Malcolm Barnes

(74) *Attorney, Agent, or Firm* — Morgan Lewis & Bockius LLP

(57) ABSTRACT

A coil component includes: a body including a molded portion having one surface and the other surface opposing each other, and a cover portion disposed on the one surface of the molded portion; a wound coil disposed between the molded portion and the cover portion in the body, and having first and second lead-out portions extending to one surface of the body; a first recess portion disposed in the one surface of the body; a first external electrode disposed on the one surface of the body to be connected to the first lead-out portion, and disposed along a surface of the first recess portion to have a first groove disposed therein; and a second external electrode disposed on the one surface of the body and connected to the second lead-out portion.

20 Claims, 10 Drawing Sheets

(56) References Cited

U.S. PATENT DOCUMENTS

| | | | | |
|---|---|---|---|---|
| 11,631,528 | B2 * | 4/2023 | Kitashima | H01F 1/20<br>336/192 |
| 2010/0007453 | A1 * | 1/2010 | Yan | H01F 41/04<br>29/602.1 |
| 2014/0266541 | A1 * | 9/2014 | Sakamoto | H01F 27/29<br>29/606 |
| 2016/0012962 | A1 * | 1/2016 | Lee | H01F 27/292<br>427/116 |
| 2016/0307694 | A1 * | 10/2016 | Ohtsubo | H01F 17/04 |
| 2017/0053739 | A1 * | 2/2017 | Oki | H01F 41/04 |
| 2017/0229234 | A1 * | 8/2017 | Lee | H01F 27/28 |
| 2018/0308630 | A1 | 10/2018 | Shinohara et al. | |
| 2020/0152367 | A1 * | 5/2020 | Sato | H01F 27/2828 |
| 2020/0281078 | A1 * | 9/2020 | Takahashi | H01F 17/0013 |
| 2020/0303118 | A1 * | 9/2020 | Wei | H01F 27/306 |
| 2020/0335253 | A1 | 10/2020 | Yeo et al. | |
| 2021/0090784 | A1 | 3/2021 | Kim et al. | |

FOREIGN PATENT DOCUMENTS

| | | | |
|---|---|---|---|
| JP | 2020-077790 | A | 5/2020 |
| KR | 10-2020-0121529 | A | 10/2020 |
| KR | 10-2191248 | B1 | 12/2020 |
| KR | 10-2021-0006495 | A | 1/2021 |

* cited by examiner

COIL COMPONENT

CROSS-REFERENCE TO RELATED APPLICATION(S)

This application claims benefit of priority to Korean Patent Application No. 10-2021-0108901 filed on Aug. 18, 2021 in the Korean Intellectual Property Office, the disclosure of which is incorporated herein by reference in its entirety.

TECHNICAL FIELD

The present disclosure relates to a coil component.

BACKGROUND

In some cases, a coil component may be manufactured by using a magnetic mold and a wound coil.

The coil component may be required to be smaller and low-profile in order to be installed in a limited space.

Meanwhile, when such a smaller and low-profile coil component is mounted on a printed circuit board, an area in which the coil component is mounted on a surface of an external electrode may be insufficient, which may result in unintentional rotation of the coil component or reduced bonding strength between the coil component and a board.

An aspect of the present disclosure may provide a coil component which may be smaller and low-profile, while having higher reliability when mounted on a printed circuit board or the like.

SUMMARY

According to an aspect of the present disclosure, a coil component may include: a body including a molded portion having one surface and the other surface opposing each other, and a cover portion disposed on the one surface of the molded portion; a wound coil disposed between the molded portion and the cover portion in the body, and having first and second lead-out portions extending to one surface of the body while being spaced apart from each other; a first recess portion disposed in the one surface of the body; a first external electrode disposed on the one surface of the body to be connected to the first lead-out portion, and disposed along a surface of the first recess portion to have a first groove disposed therein; and a second external electrode disposed on the one surface of the body while being spaced apart from the first external electrode and connected to the second lead-out portion.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
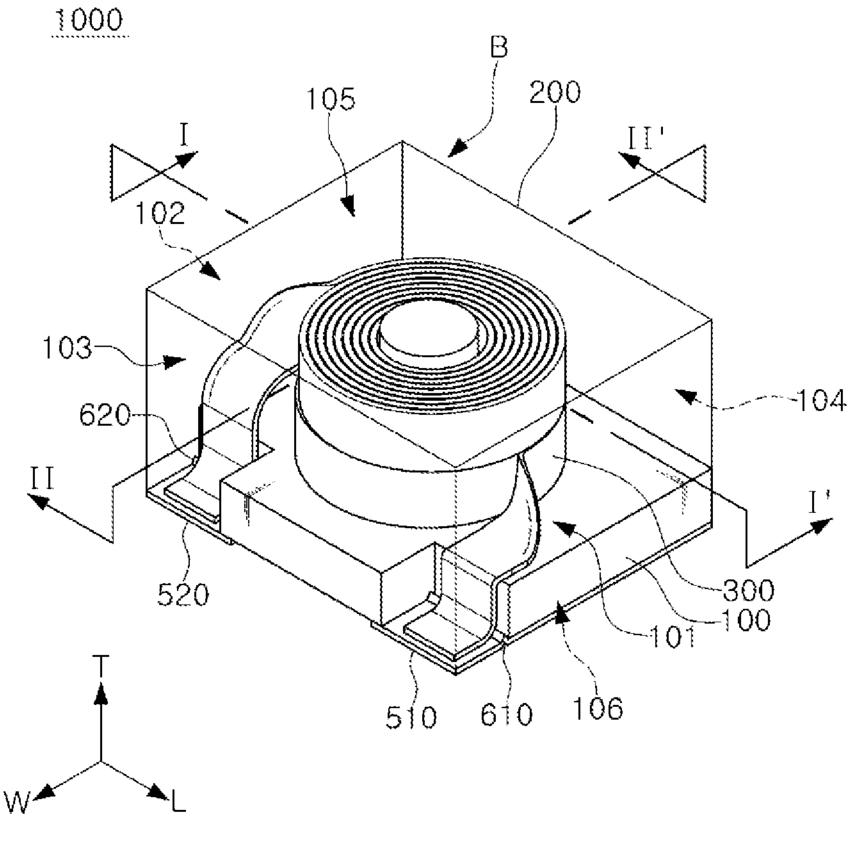
FIG. 1 is a perspective view schematically illustrating a coil component according to a first exemplary embodiment of the present disclosure.

Hereinafter, exemplary embodiments in the present disclosure will be described in detail with reference to the accompanying drawings.

In the drawings, an L direction refers to a first direction or a length direction, a W direction refers to a second direction or a width direction, and a T direction refers to a third direction or a thickness direction.

Hereinafter, coil components according to exemplary embodiments of the present disclosure will be described in detail with reference to the accompanying drawings. In describing exemplary embodiments of the present disclosure with reference to the accompanying drawings, components that are the same as or which correspond to each other will be denoted by the same reference numerals, and an overlapping description thereof will be omitted.

Various kinds of electronic components may be used in an electronic device, and various kinds of coil components may be appropriately used between these electronic components depending on their purposes in order to remove noise or the like.

That is, the coil components used in the electronic device may be a power inductor, high frequency (HF) inductor, a general bead, a bead for a high frequency (GHz), a common mode filter and the like.

First Exemplary Embodiment

Figure 2:
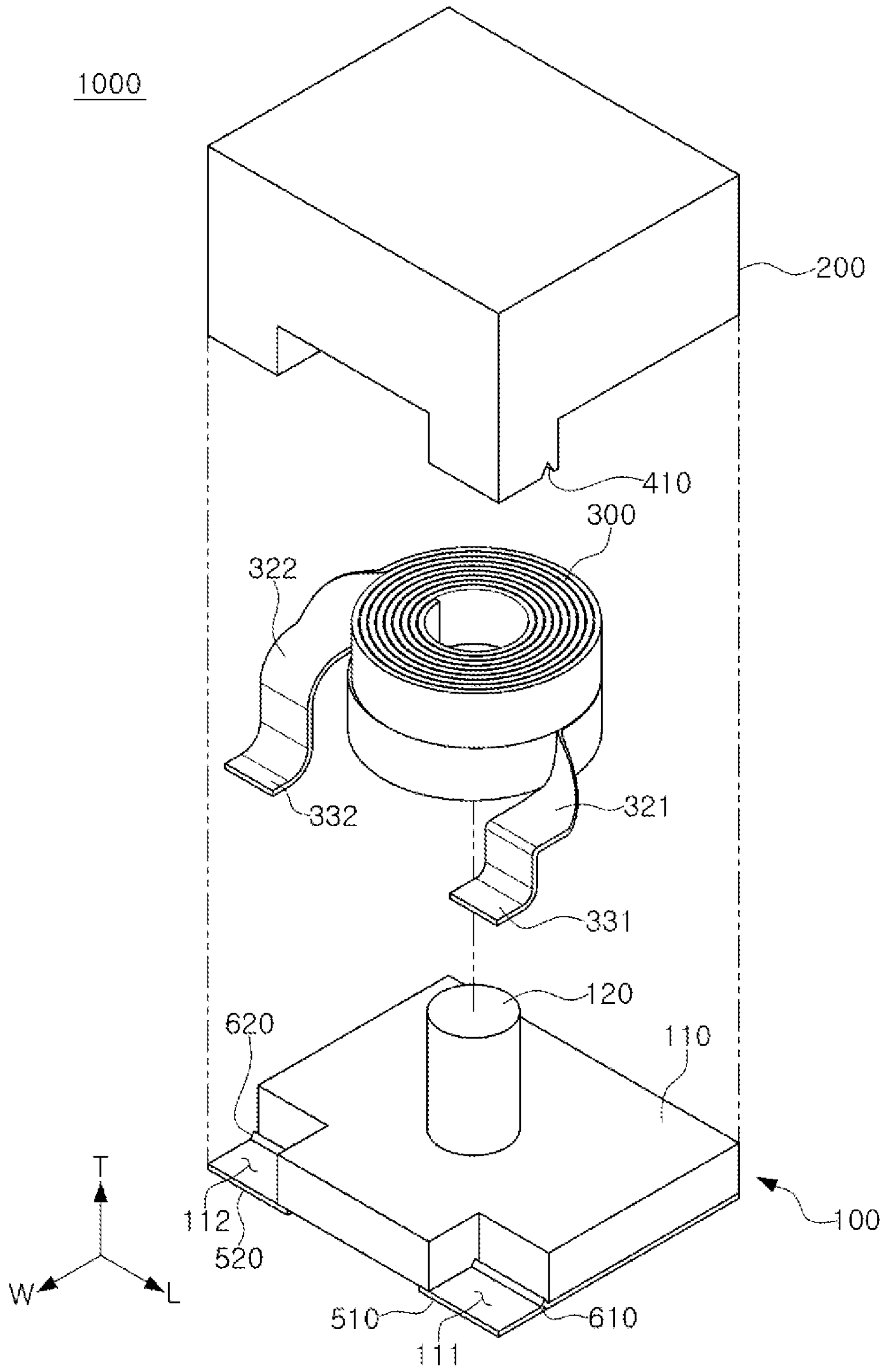
FIG. 2 is an exploded perspective view of FIG. 1.
Figure 3:
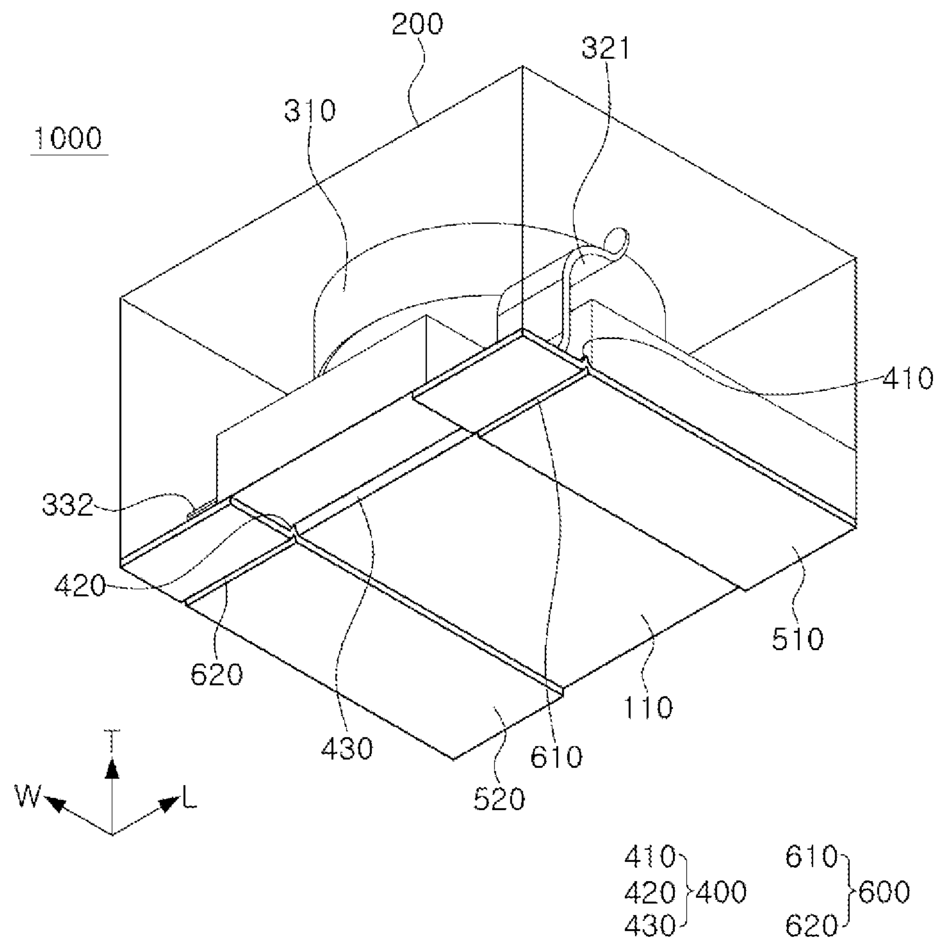
FIG. 3 is a view of the coil component in FIG. 1 viewed from bottom.
Figure 4:
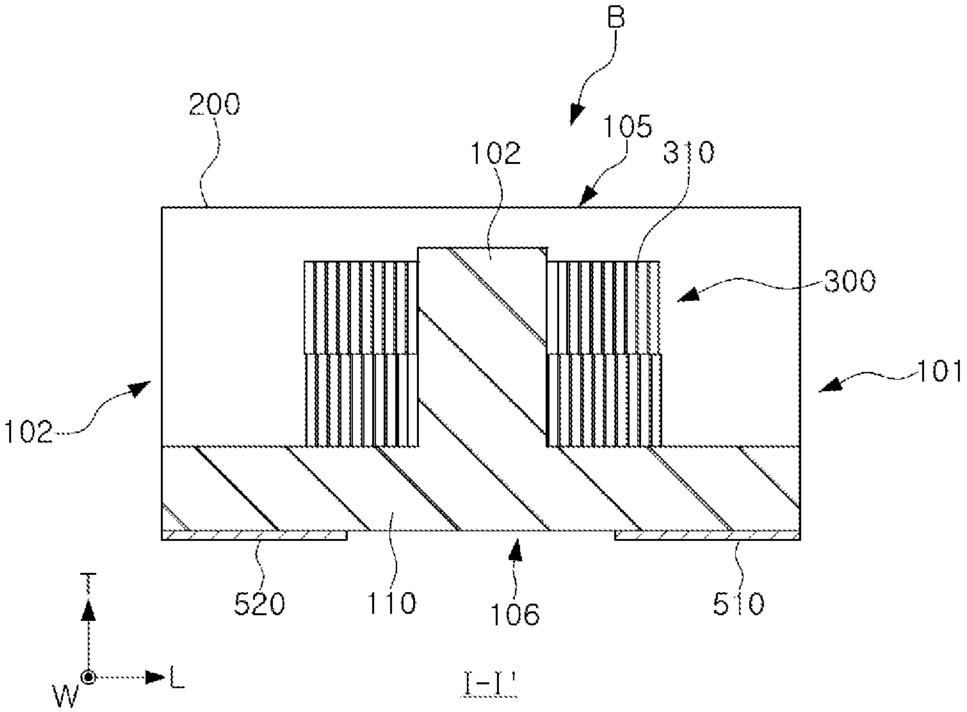
FIG. 4 is a cross-sectional view taken along line I-I' of FIG. 1.
Figure 5:
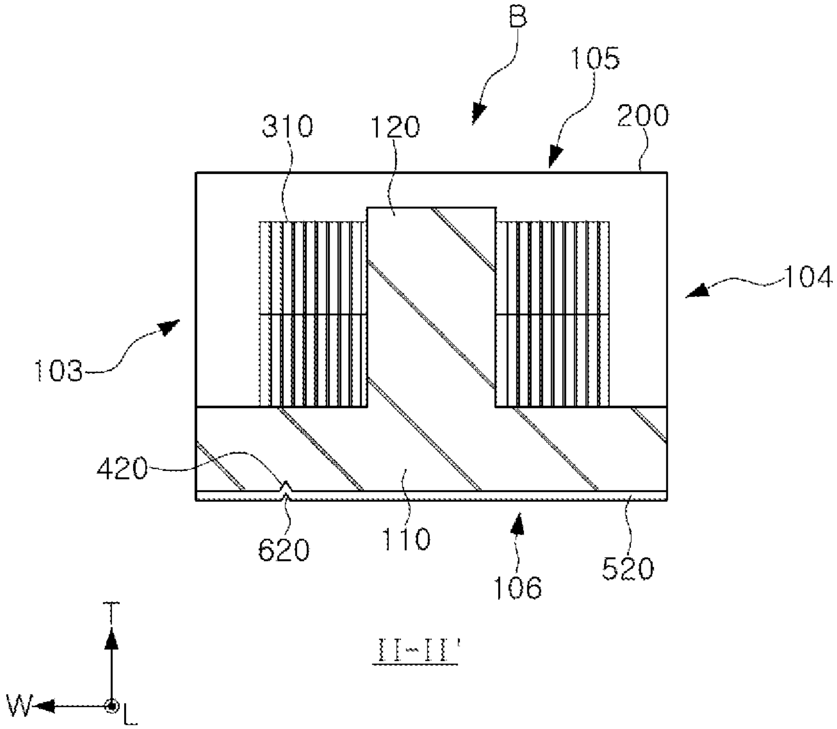
FIG. 5 is a cross-sectional view taken along line II-II' of FIG. 1.
Figure 6:
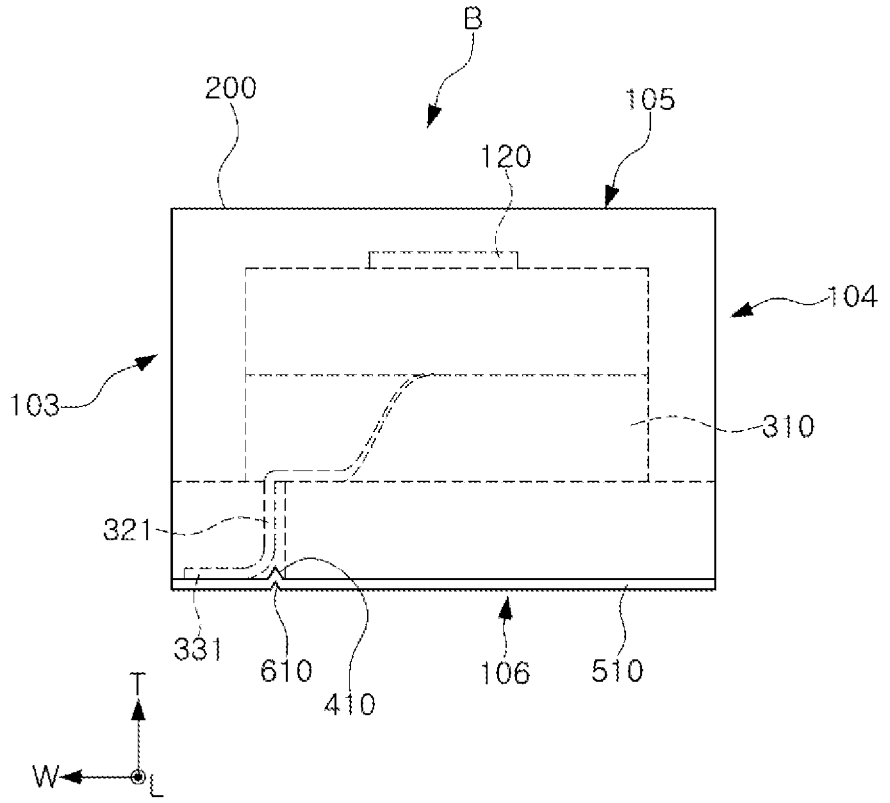
FIG. 6 is a side view of FIG. 1.

FIG. 1 is a perspective view schematically illustrating a coil component 1000 according to a first exemplary embodiment of the present disclosure, FIG. 2 is an exploded perspective view of FIG. 1, FIG. 3 is a view of the coil component 1000 in FIG. 1 viewed from bottom, FIG. 4 is a cross-sectional view taken along line I-I' of FIG. 1, FIG. 5 is a cross-sectional view taken along line II-II' of FIG. 1, and FIG. 6 is a side view of FIG. 1. Meanwhile, the drawings omit an insulating layer positioned outside the body to more clearly show a coupling relationship between the components in the present disclosure.

Referring to FIGS. 1 through 6, the coil component 1000 according to the first exemplary embodiment of the present disclosure includes a body B, a wound coil 300, a recess portion 400, an external electrode 500 and first and second grooves 610 and 620 formed in first and second external electrodes 510 and 520.

The body B may include a molded portion 100 and a cover portion 200. The molded portion 100 may include a base portion 110 and a core 120. In addition, the base portion 110 may include receiving grooves 111 and 112.

The body B may form an exterior of the coil component 1000 according to this exemplary embodiment, and may embed the wound coil 300 therein.

The body B may generally have a hexahedral shape.

Referring to FIG. 1, the body B may have a first surface 101 and a second surface 102 opposing each other in the length (L) direction, a third surface 103 and a fourth surface 104 opposing each other in the width (W) direction, and a fifth surface 105 and a sixth surface 106 opposing each other in the thickness (T) direction. Each of the first to fourth surfaces 101, 102, 103 and 104 of the body B may correspond to a wall surface of the body B, connecting the fifth surface 105 and the sixth surface 106 of the body B to each other. Hereinafter, both end surfaces of the body B may refer to the first and second surfaces 101 and 102 of the body B, both side surfaces of the body B may refer to the third and fourth surfaces 103 and 104 of body B, and one and the other surfaces of the body B may refer to the sixth and the fifth surface 106 and 105 of the body B.

For example, the body B of the coil component 1000 including the external electrodes 510 and 520 described below according to this exemplary embodiment may have a length of 2.0 mm, a width of 1.2 mm and a thickness of 0.65 mm, and is not limited thereto.

Meanwhile, the body B may include the molded portion 100 and the cover portion 200 disposed on one surface of the molded portion 100. Referring to FIG. 1 through FIG. 6, side surfaces of the molded portion 100 and cover portion 200 may be the first to fourth surfaces 101, 102, 103 and 104 of the body B, one surface of the cover portion 200 (i.e. an upper surface of the cover portion 200 based on the direction in FIG. 1) may be the fifth surface 105 of the body B, and the other surface of the molded portion 100 (i.e. a lower surface of the molded portion 100 based on the direction in FIG. 1) may be the sixth face 106 of the body B. Hereinafter, the other surface of the molded portion 100 and the sixth surface of the body B may indicate the same surface.

The molded portion 100 may have one surface and the other surface opposing each other. The molded portion 100 may include the base portion 110 and the core 120. The base portion 110 may support the wound coil 300. The core 120 may protrude from a center of one surface of the base portion 110 and pass through the wound coil 300. For the above reason, in the present specification, the one and the other surfaces of the molded portion 100 may respectively refer to the same surfaces as the one and the other surfaces of the base portion 110.

The base portion 110 may have a thickness of 200 μm or more. When having the thickness of less than 200 μm, it may be difficult for the base portion 110 to secure its rigidity. The core 120 may have a thickness of 150 μm or more, and is not limited thereto.

Referring to FIG. 2, the base portion 110 may include the receiving grooves 111 and 112 through which bent portions 321 and 322 pass to expose lead-out portions 331 and 332 of the wound coil 300, which are described below. However, the present disclosure is not limited thereto. The first receiving groove 111 may be formed at a corner where the first, third and sixth surfaces 101, 103 and 106 of the body B meet one another, and the second receiving groove 112 may be formed at a corner where the second, third and six surfaces 102, 103 and 106 of the body meet one another.

The cover portion 200 may cover the molded portion 100 and the wound coil 300 described below. The cover portion 200 may be disposed on the base portion 110 and core 120 of the molded portion 100 and the wound coil 300, and then pressed to be coupled to the molded portion 100. Here, when the receiving grooves 111 and 112 are formed in the base portion 110, the cover portion 200 may be coupled to the base portion 110 by filling the receiving grooves 111 and 112. Accordingly, when the cover portion 200 includes a magnetic material, the same component as the magnetic material of the cover portion 200 may be disposed in the receiving grooves 111 and 112.

At least one of the molded portion 100 and the cover portion 200 may include the magnetic material. In this exemplary embodiment, both the molded portion 100 and the cover portion 200 may include the magnetic material. The molded portion 100 may be formed by filling a mold for forming the molded portion 100 with the magnetic material. Alternatively, the molded portion 100 may be formed by filling the mold with a composite material including the magnetic material and an insulating resin. It is possible to further perform a molding process of applying high temperature and high pressure to the magnetic material or composite material in the mold, and the present disclosure is not limited thereto. Alternatively, the molded portion 100 may be formed in a molding process of applying high temperature and high pressure to a magnetic composite sheet, in which the magnetic materials are dispersed in the insulating resin, by using the mold, and is not limited thereto.

The base portion 110 and the core 120 may be formed integrally with each other using the mold. Meanwhile, the receiving grooves 111 and 112 may also be formed for the wound coil to pass therethrough by using the mold.

The cover portion 200 may be formed by disposing the magnetic composite sheet in which the magnetic material is dispersed in the insulating resin on the molded portion 100 and then heating and pressing the same.

In this exemplary embodiment, the molded portion 100 may be formed at high temperature and high pressure, and the cover portion 200 may then be formed by disposing the wound coil 300 described below and stacking the sheets. In this case, the molded portion 100 may have a magnetic material filling rate higher than that of the cover portion 200. Here, the magnetic material filling rate may refer to a fraction of a space occupied by the magnetic material in a space filled with magnetic material particles.

The magnetic material included in the molded portion 100 and cover portion 200 may be ferrite or magnetic metal powder particles.

The ferrite powder particles may include, for example, at least one of a spinel type ferrite such as Mg—Zn-based ferrite, Mn—Zn-based ferrite, Mn—Mg-based ferrite, Cu—Zn-based ferrite, Mg—Mn—Sr-based ferrite or Ni—Zn-based ferrite; a hexagonal type ferrite such as Ba—Zn-based ferrite, Ba—Mg-based ferrite, Ba—Ni-based ferrite, Ba—Co-based ferrite or Ba—Ni—Co-based ferrite; and a garnet type ferrite such as Y-based ferrite and Li-based ferrite.

The metal magnetic powder particles may include one or more selected from the group consisting of iron (Fe), silicon (Si), chromium (Cr), cobalt (Co), molybdenum (Mo), aluminum (Al), niobium (Nb), copper (Cu) and nickel (Ni). For example, the metal magnetic powder particles may be one or more of pure iron powder particles, Fe—Si-based alloy powder particles, Fe—Si—Al-based alloy powder particles, Fe—Ni-based alloy powder particles, Fe—Ni—Mo-based alloy powder particles, Fe—Ni—Mo—Cu-based alloy powder particles, Fe—Co-based alloy powder particles, Fe—Ni—Co-based alloy powder particles, Fe—Cr-based alloy powder particles, Fe—Cr—Si-based alloy powder particles, Fe—Si—Cu—Nb-based alloy powder particles, Fe—Ni—Cr-based alloy powder particles and Fe—Cr—Al-based alloy powder particles.

The metal magnetic powder particles may be amorphous or crystalline. For example, the metal magnetic powder particles may be Fe—Si—B—Cr based amorphous alloy powder particles, and are not necessarily limited thereto.

The ferrite and the metal magnetic powder particles may have average diameters of about 0.1 μm to 30 μm, respectively, and are not limited thereto.

The molded portion 100 and the cover portion 200 may each include two or more types of magnetic materials. Here, different types of magnetic materials may indicate that the magnetic materials are distinguished from each other by any one of an average diameter, a composition, crystallinity and a shape.

The insulating resin may include epoxy, polyimide, liquid crystal polymer (LCP) or the like, or a mixture thereof, and is not limited thereto.

The wound coil 300 may be embedded in the body B to express a characteristic of the coil component. For example, when the coil component 1000 of this exemplary embodiment is used as a power inductor, the wound coil 300 may serve to store an electric field as a magnetic field to maintain an output voltage, thereby stabilizing power of the electronic device.

The wound coil 300 may be disposed in the body B, and the first and second lead-out portions 331 and 332 may be exposed to the surface of the body B. In detail, the wound coil 300 may include a wound portion 310 having at least one turn formed by using the core 120 of the base portion 110 as an axis, the first and second lead-out portions 331 and 332 exposed to the sixth surface 106 of body B while being spaced apart from each other, and the first and second bent portions 321 and 322 respectively connecting the wound portion 310 and the first and second lead-out portions 331 and 332 to each other. The first and second bent portions 321 and 322 may respectively pass through the first and second receiving grooves 111 and 112 of the base portion 110, and may have one end connected to the wound portion 310, and the other end connected to each of the lead-out portions 331 and 332.

The wound coil 300 may be an air-core coil and may be a flat coil. The wound coil 300 may be formed by winding a conductive metal, and may have the remainder covered with an insulating covering layer, except for a portion in contact with the external electrode 510 or 520 described below. In detail, the wound coil 300 may be formed by winding, in a spiral shape, a metal wire such as a copper wire (Cu-wire) including the metal wire and the covering layer covering a surface of the metal wire. Accordingly, an entire surface of each of the plurality of turns of the wound coil 300 may be coated with the covering layer. Meanwhile, the metal wire may be a flat wire, and is not limited thereto. As shown in FIGS. 4 and 5, the wound coil 300 may be a flat wire. In this case, the wound coil 300 may have a rectangular cross section of each turn for example.

The wound portion 310 may have the plurality of turns from the core 120 to the outside of the body B in the length (L) direction or the width (W) direction of the body B. The wound portion 310 may have a cylindrical shape including an upper surface and a lower surface entirely similar to a ring shape, an inner surface and an outer surface connecting the upper surface and the lower surface to each other, and a cylindrical hollow portion formed in its center. The wound portion 310 may be the air core coil, and the core 120 may be disposed in the air core of the wound portion 310.

The first and second lead-out portions 331 and 332 may be both ends of the wound coil 300, and may be exposed to the sixth surface 106 of the body B while being spaced apart from each other. The first and second lead-out portions 331 and 332 may be the remainder remaining after forming the wound portion 310 and first and second bent portions 321 and 322 described below of the metal wire such as the copper wire whose surface is covered with the covering layer. Therefore, a boundary may not be formed between the first and second lead-out portions 331 and 332 and the first and second bent portions 321 and 322. In addition, like the wound portion 310, the covering layer may be formed on surfaces of the first and second lead-out portions 331 and 332, and the covering layer may be removed from each portion of the first and second lead-out portions 331 and 332, exposed to the sixth surface 106 of the body B.

Meanwhile, the wound coil 300 may include the first and second bent portions 321 and 322 respectively connecting the wound portion 310 and the first and second lead-out portions 331 and 332 to each other. Referring to FIG. 2, the first and second bent portions 321 and 322 may respectively pass through the first and second receiving grooves 111 and 112 of the base portion 110, and may be connected with the first and second lead-out portions 331 and 332. In this exemplary embodiment, when the first and second lead-out portions 331 and 332 of the wound coil 300, which are the flat wires, are exposed to the sixth surface 106 of this body B, the coils may be twisted outwardly from the first and second bent portions 321 and 322 to expose a flat surface, thereby increasing respective areas in which the first and second bent portions 321 and 322 are directly connected to the external electrodes 510 and 520 described below. In addition, the first and second bent portions 321 and 322 may be the remainder except for the wound portion 310 and first and second lead-out portions 331 and 332 of the metal wire such as the copper wire whose surface is covered with the covering layer. Accordingly, the boundary may not be formed between the first and second bent portions 321 and 322 and the wound portion 310. In addition, like the wound portion 310, the covering layer may be formed on the surfaces of the first and second bent portions 321 and 322.

The covering layer may include epoxy, polyimide, liquid crystal polymer (LCP) or the like, or a mixture thereof, and is not limited thereto.

The recess portion 400 may be formed in the sixth surface 106 of the body B, and may have a shape of a straight line intersecting the length (L) direction. The recess portion 400 may be a reference for the shape and position of a groove 600 formed in the external electrodes 510 and 520 described below. The groove 600 described below may be formed in each of the external electrodes 510 and 520 along the recess portion 400. In this manner, it is possible to prevent rotation of the coil component 1000 when the coil component 1000 is mounted on the printed circuit board P, and to improve bonding strength between the coil component and the printed circuit board by increasing an area of a surface on which the coil component is mounted.

The recess portion 400 may include a first recess portion 410 formed in a region of the sixth surface 106 of the body B, where the first external electrode 510 described below is disposed, a second recess portion 420 formed in a region thereof, where the second external electrode 520 is disposed, and a third recess portion 430 formed in a region thereof, between the first and second external electrodes 510 and 520.

Referring to FIGS. 3 and 6, the first and second recess portions 410 and 420 may be formed between a region of the sixth surface 106 of the body B, where the first and second lead-out portions 331 and 332 are exposed and a region of the sixth surface 106 of the body B, where the other surface of the molded portion 100 is exposed. In addition, the first and second recess portions 410 and 420 may be formed in regions below the first and second bent portions 321 and 322 of the sixth surface 106 of the body B.

Referring to FIG. 6, an inclined surface close to each of the first and second lead-out portions 331 and 332 among the cross sections of the first and second recess portions 410 and 420, may have an inclined direction coincident with a direction from one end of the first or second bent portion 321 or 322, connected to the wound portion 310, to the other end connected to the first or second lead-out portion 331 or 332, based on a width-thickness (W-T) cross section.

The recess portion 400 may have the first and second recess portions 410 and 420 disposed in only one of the regions in which the external electrodes 510 and 520 described below are respectively disposed on the sixth surface 106 of the body B, or the first and second recess portions 410 and 420 disposed in both the regions. Alternatively, the recess portion 400 may also have a third recess portion 430 disposed in the region between the external electrodes 510 and 520 so that the first to third recess portions 410, 420 and 430 are entirely connected to one another in addition to the first and second recess portions 410 and 420 disposed in both the regions as in this exemplary embodiment. However, the present disclosure is not limited thereto.

When the recess portions of the recess portion 400 are entirely connected to each other as one, it is possible not only to prevent the rotation of the coil component 1000 and improve the bonding strength between the coil component and the printed circuit board, when the component is mounted on the printed circuit board P, but also to increase productivity of the component because the recess portion 400 may be formed by being pressed using the mold having a straight protrusion before the coil component is diced into individual units during a manufacturing process thereof. Meanwhile, based on the W-T cross section, the recess portion 400 may have a shape such as a triangular shape, a tapered shape, an arc shape or the like depending on a shape of the protrusion mold for forming the recess portion 400, and is not limited thereto. A detailed process of forming the recess portion 400 is described below.

The first and second external electrodes 510 and 520 may be disposed on the sixth surface 106 of the body B, i.e., the other surface of the base portion 110, while being spaced apart from each other, and may respectively be connected to the first and second lead-out portions 331 and 332 of the wound coil 300.

The first and second external electrodes 510 and 520 may be disposed parallel to each other in the width (W) direction. In addition, the first and second grooves 610 and 620 described below may respectively be formed in the first and second external electrodes 510 and 520.

The first and second external electrodes 510 and 520 may each have a monolayer or multilayer structure. For example, the first and second external electrodes 510 and 520 may be disposed on a first conductive layer including copper (Cu), a second conductive layer disposed on the first conductive layer and including nickel (Ni), and a third conductive layer disposed on the second conductive layer and including tin (Sn). At least one of the second conductive layer and the third conductive layer may cover the first conductive layer, and a scope of the present disclosure is not limited thereto. The first conductive layer may be a plating layer or a conductive resin layer formed by coating and curing a conductive resin including conductive powder particles including at least one of copper (Cu) and silver (Ag) and a resin. The second and third conductive layers may be the plating layers, and the scope of the present disclosure is not limited thereto.

The first and second external electrodes 510 and 520 may be formed by vapor deposition such as sputtering and/or electroplating, and are not limited thereto.

The first and second external electrodes 510 and 520 may be formed of a conductive material such as copper (Cu), aluminum (Al), silver (Ag), tin (Sn), gold (Au), nickel (Ni), lead (Pb), chromium (Cr), titanium (Ti) or alloys thereof, and are not limited thereto.

The first and second grooves 610 and 620 may be formed in the first and second external electrodes 510 and 520 to prevent the rotation of the coil component 1000 when the coil component 1000 is mounted on the printed circuit board P and to improve the bonding strength between the coil component and the printed circuit board by increasing the area of the surface on which the component is mounted.

Figure 9:
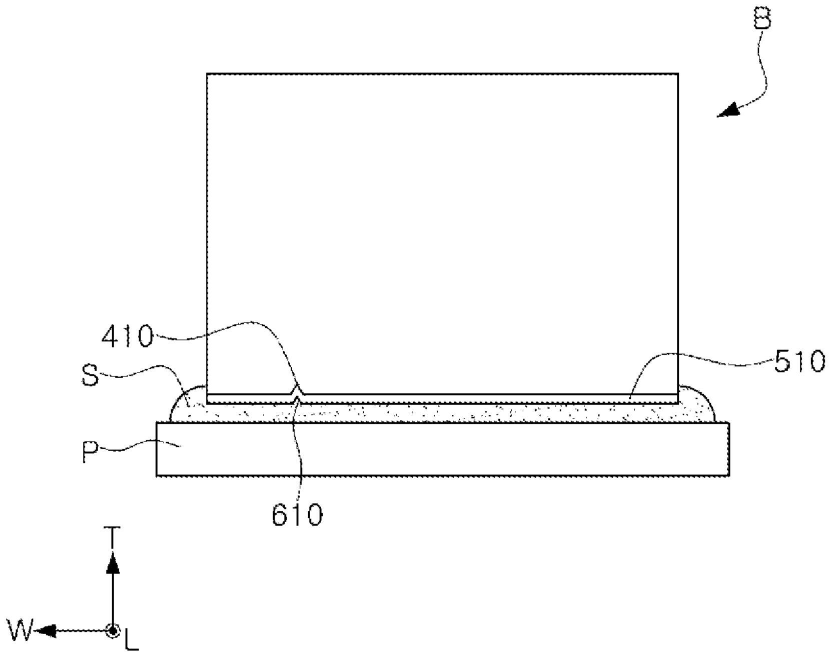
FIG. 9 is a side view illustrating that the coil component in FIG. 1 is mounted on a printed circuit board.

In detail, Referring to FIG. 9, solder S serving to connect the coil component 1000 and the printed circuit board P to each other may fill the inside of each of the grooves 610 and 620 when the coil component 1000 is mounted on the printed circuit board P, the coil component 1000 may thus be prevented from being rotated, and mounted in a correct direction. In addition, the area of a surface on which the coil component is mounted may be increased compared to a case in which the coil component does not include the grooves 610 and 620 to increase a surface on which the coil component is bonded to the solder S, thereby improving the bonding strength between the coil component 1000 and the printed circuit board P.

The first groove 610 may be formed on the first external electrode 510 disposed along a surface of the first recess portion 410. The second groove 620 may be formed on the second external electrode 520 disposed along a surface of the second recess portion 420. The first and second grooves 610 and 620 may be spaced apart from each other.

The first and second grooves 610 and 620 may respectively be formed in the first and second external electrodes 510 and 520 when the first and second external electrodes 510 and 520 are disposed in the shapes of the first and second recess portions 410 and 420 by the vapor deposition and/or the electroplating. Accordingly, the first and second grooves 610 and 620 may respectively have shapes corresponding to the shapes of the first and second recess portions 410 and 420. However, when the first or second external electrode 510 or 520 has a greater thickness, a shape of a surface of the first or second external electrode 510 or 520 in contact with the first or second recess portion 410 or 420 may be different from a shape of a surface of the first or second groove 610 or 620. For example, the surface of the first or second groove 610 or 620 may have a greater flatness than the first or second recess portion 410 or 420, and is not limited thereto.

Each of the first and second grooves 610 and 620 may have a shape of a straight line perpendicular to each of the first and second external electrodes 510 and 520 disposed parallel to each other in the width direction.

The first and second grooves 610 and 620 may be formed in the shape of the recess portion 400. Accordingly, when the first or second recess portion 410 or 420 is formed in only one of the regions where the external electrodes 510 and 520 are respectively disposed on the sixth surface 106 of the body B, the groove 610 or 620 may also be formed in only the external electrode 510 or 520 where the recess portion 400 is formed.

In addition, when the first and second recess portions 410 and 420 are formed in both the regions in which the external electrodes 510 and 520 are respectively disposed on the sixth surface 106 of the body B, the grooves 610 and 620 may also be formed in both the external electrodes 510 and 520 where the recess portions 410 and 420 are formed. When the grooves 610 and 620 are formed on both the external electrodes 510 and 520, compared to the case in which the groove 610 or 620 is formed in only one external electrode, the grooves 610 and 620 may function as anchors acting on both sides of the coil component, thereby preventing the rotation of the component or improving the bonding strength between the component and the printed circuit board, when the component is mounted on the printed circuit board.

Referring to FIGS. 3 and 6, the first and second grooves 610 and 620 may respectively be formed in the first and second external electrodes 510 and 520, in a region below the first and second recess portions 410 and 420 formed between the region of the sixth surface 106 of body B, where the first and second lead-out portions 331 and 332 are exposed and the region where the other surface of the molded portion 100 is exposed. In addition, the first and second grooves 610 and 620 may respectively be formed in the first and second external electrodes 510 and 520, in a region below the first and second bent portions 321 and 322.

Referring to FIGS. 5 and 6, the first or second groove 610 or 620 may have a cross-sectional area gradually smaller inward the coil component 1000, based on a cross section in a length-width (L-W) direction. That is, the first or second groove 610 or 620 may have a cross-sectional area of its inner surface smaller than on a cross-sectional area of its outer surface, based on a cross section parallel to the sixth surface 106 of the body B. In detail, the first or second groove 610 or 620 may have the triangular shape, a wedge shape, the tapered shape, the arc-shape or the like, based on the W-T cross section, and is not limited thereto. Due to such a structure of the first or second groove 610 or 620, the solder S for bonding the coil component 1000 and the printed circuit board P to each other may be easily accommodated in the first and second grooves 610 and 620 when the coil component is mounted on the printed circuit board.

In addition, an inclined surface close to each of the first and second lead-out portions 331 and 332 among the cross sections of the first and second grooves 610 and 620 may have the inclined direction coincident with the direction from one end of the first or second bent portion 321 or 322, connected to the wound portion 310, to the other end connected to the first or second lead-out portion 331 or 332, and is not limited thereto, based on the W-T cross section.

Meanwhile, although not shown in the drawings, the coil component 1000 according to this exemplary embodiment may further include an insulating layer disposed in a region of the sixth surface 106 of the body B, except for the region where the external electrodes 510 and 520 are disposed. The insulating layer may be used as a plating resist when forming the external electrodes 510 and 520 by the electroplating, and is not limited thereto. In addition, the insulating layer may also be disposed on at least a portion of the first to fifth surfaces 101, 102, 103, 104 and 105 of the body B.

Second and Third Exemplary Embodiments

Figure 7A:
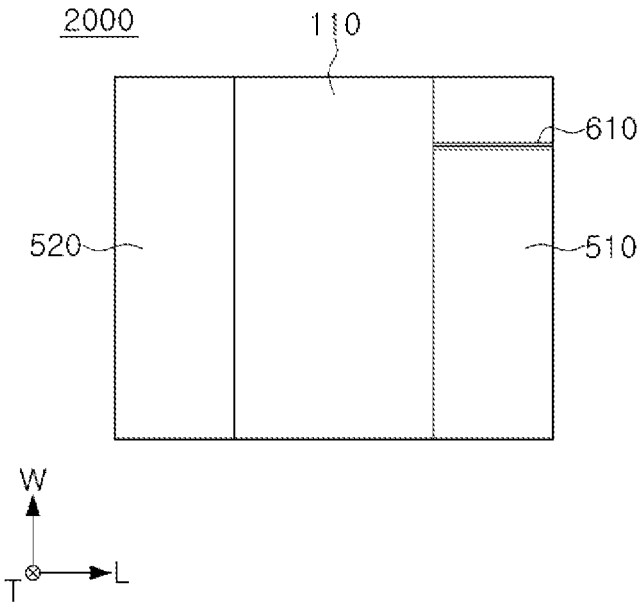
FIGS. 7A and 7B are views respectively illustrating coil components according to second and third exemplary embodiments of the present disclosure, and are views each corresponding to the bottom view of FIG. 1.
Figure 7B:
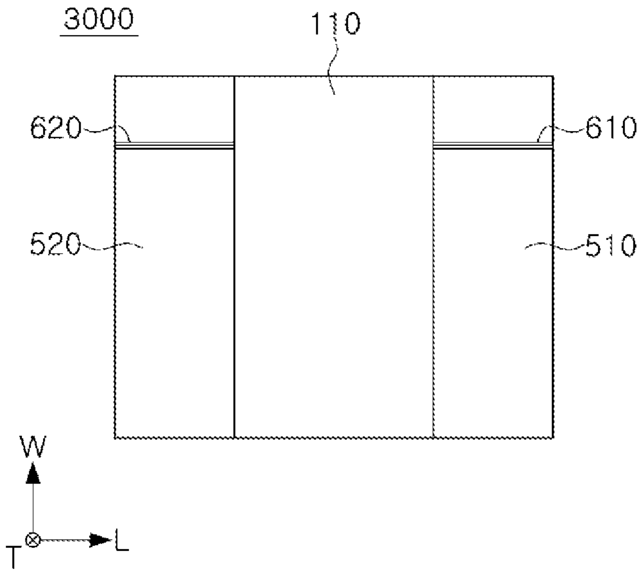

FIGS. 7A and 7B are views respectively illustrating coil components 2000 and 3000 according to second and third exemplary embodiments of the present disclosure, and are views each corresponding to the bottom view of FIG. 1.

Referring to FIG. 7, in the coil components 2000 and 3000 according to these exemplary embodiments, the recess portion 400 and the grooves 610 and 620 may have different numbers, dispositions or the like, when compared to those in the coil component 1000 according to the first exemplary embodiment of the present disclosure. Therefore, when describing these exemplary embodiments, the description describes only the recess portion 400 and the grooves 610 and 620, which are different from those in the first exemplary embodiment. For the other components in these exemplary embodiments, the description for those in the first exemplary embodiment of the present disclosure may be applied as it is.

Referring to FIG. 7A, in the coil component 2000 according to a second exemplary embodiment, the groove 600 may be formed in only one of the external electrodes 510 and 520. In this exemplary embodiment, the first groove 610 may be formed only in the first external electrode 510.

Although not shown in the drawing, the groove 600 may be formed in the shape of the recess portion 400, and the first recess portion 410 may thus be formed only in the first external electrode 510 where the first groove 610 is formed. Such a structure may be formed by adjusting the mold to have the protrusion limitedly positioned in the region where the first external electrode 510 is to be disposed when the recess portion 400 is formed in the manufacturing process of the coil component, described below.

It is possible to allow a smaller amount of the magnetic material to be reduced in the body B, thereby improving an inductance characteristic of the coil component when the recess portion 410 and the groove 610 are formed in only one external electrode as in this exemplary embodiment, compared to the case in which the recess portion 410 and the groove 610 are formed in both the external electrodes 510 and 520.

Referring to FIG. 7B, in the coil component 3000 according to the third exemplary embodiment, the first and second grooves 610 and 620 may respectively be formed on the first and second external electrodes 510 and 520. Meanwhile, unlike the first exemplary embodiment, the third recess portion 430 may not be disposed in the region of the other surface of the base portion 110, between the first and second external electrodes 510 and 520.

Although not shown in the drawing, the groove 600 is formed in the shape of the recess portion 400, and the first and second recess portions 410 and 420 may thus respectively be formed on the first and second external electrodes 510 and 520 in which the first and second grooves 610 and 620 are formed. Such a structure may be formed by adjusting the mold to have the protrusion limitedly positioned in the region where the first or second external electrode 510 or 520 is to be disposed when the recess portion 400 is formed in the manufacturing process of the coil component, described below.

It is possible to allow the less amount of the magnetic material to be reduced in the body B, thereby improving the inductance characteristic of the coil component when the third recess portion 430 is not formed in the other surface of the base portion 110 as in this exemplary embodiment, compared to the case in which the third recess portion 430 is formed therein.

Fourth to Sixth Exemplary Embodiments

Figure 8A:
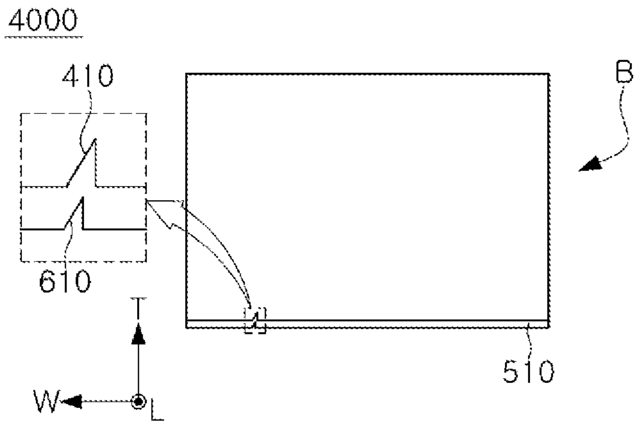
FIGS. 8A, 8B and 8C are views respectively illustrating coil components according to fourth to sixth exemplary embodiments of the present disclosure, and are views each corresponding to the view of FIG. 6.
Figure 8B:
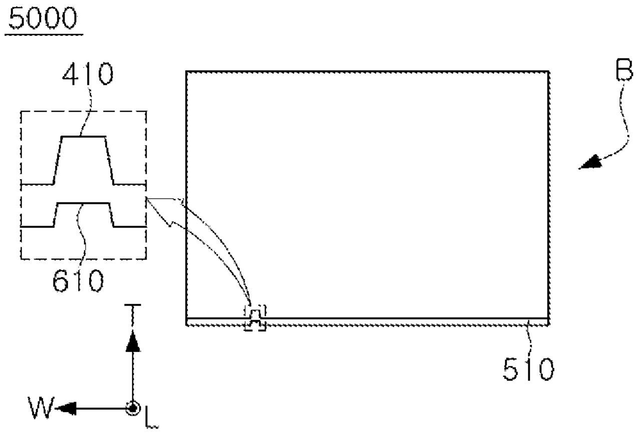
Figure 8C:
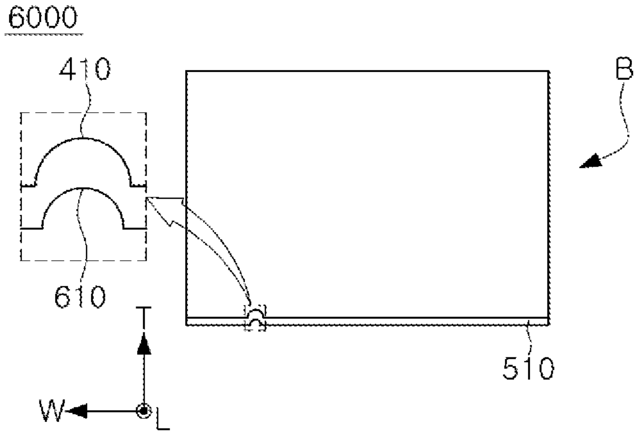

FIGS. 8A, 8B and 8C are views respectively illustrating coil components 4000, 5000 and 6000 according to fourth to sixth exemplary embodiments of the present disclosure, and are views each corresponding to the view of FIG. 6.

Referring to FIGS. 8A, 8B and 8C, in the coil components 4000, 5000 and 6000 according to fourth to sixth exemplary embodiments of the present disclosure, the first recess portion 410 and the first groove 610 may have different W-T cross-sectional shapes when compared to those in the coil component 1000 according to the first exemplary embodiment of the present disclosure. Therefore, when describing these exemplary embodiments, the description describes only the first recess portion 410 and the first groove 610, which are different from those in the first exemplary embodiment. For the other components of these exemplary embodiments, the description for those in the first exemplary embodiment of the present disclosure may be applied as it is.

Referring to FIG. 8A, in the coil component 4000 according to the fourth exemplary embodiment, the first recess portion 410 and the first groove 610 may have the shape of a wedge protruding inward the body B, based on the W-T cross section. In addition, the first recess portion 410 and the first groove 610 may each have an inclined surface inclined on only one side, based on the W-T cross section, which is different from those in the first exemplary embodiment, each having the triangular shape. Here, each inclined surface of the first recess portion 410 and the first groove 610 may have the inclined direction coincident with the direction from one end of the first bent portion 321, connected to the wound portion 310, to the other end connected to the first lead-out portion 331, based on the W-T cross section.

Referring to FIG. 8B, in the coil component 5000 according to the fifth exemplary embodiment, the first recess portion 410 and the first groove 610 may each have the shape of a taper narrower from the outside to the inside of the body B, based on the W-T cross section. Due to such a structure of the first groove 610, the solder S for bonding the coil component 5000 and the printed circuit board P to each other may be easily accommodated in the first groove 610 when the coil component is mounted on the printed circuit board. In addition, an amount of the solder S accommodated in the first groove 610 may be increased, compared to a case in which each of the first recess portion 410 and the first groove 610 has the triangular shape based on the W-T cross section, thereby improving the bonding strength between the coil component and the printed circuit board.

Referring to FIG. 8C, in the coil component 6000 according to the sixth exemplary embodiment, the first recess portion 410 or the first groove 610 may have a shape of an arc convex inward the body B, based on the W-T cross section. Due to such a structure of the first groove 610, the solder S for bonding the coil component 6000 and the printed circuit board P to each other may be easily accommodated in the first groove 610 when the coil component is mounted on the printed circuit board. In addition, the solder S may uniformly fill the first groove 610 to minimize a space without the solder S, compared to a case in which each of the first recess portion 410 and the first groove 610 has a polygonal shape based on the W-T cross section, thereby improving the bonding strength between the first groove 610 and the solder S. As a result, it is possible to improve the bonding strength between the coil component 6000 and the printed circuit board P.

Mounting Effect and Manufacturing Process

Figure 10A:
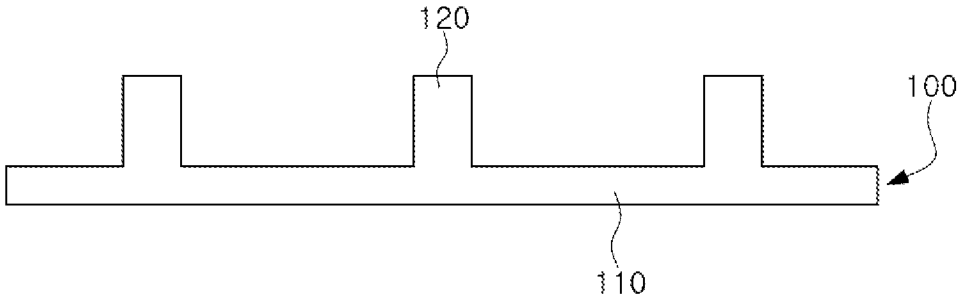
FIGS. 10A, 10B and 10C are views illustrating a first half sequence of a manufacturing process of the coil component in FIG. 1.
Figure 10B:
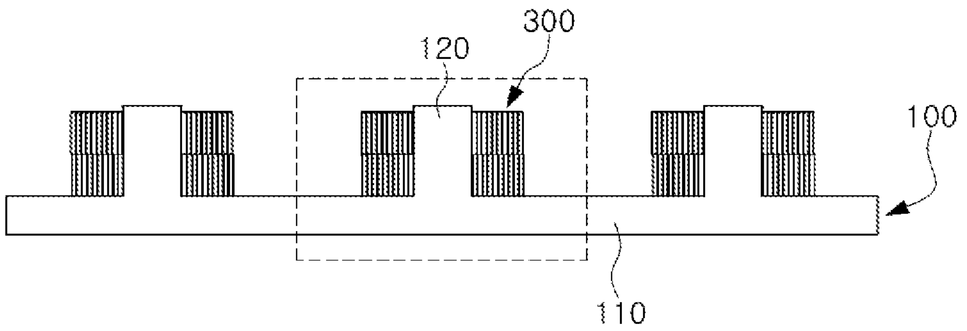
Figure 10C:
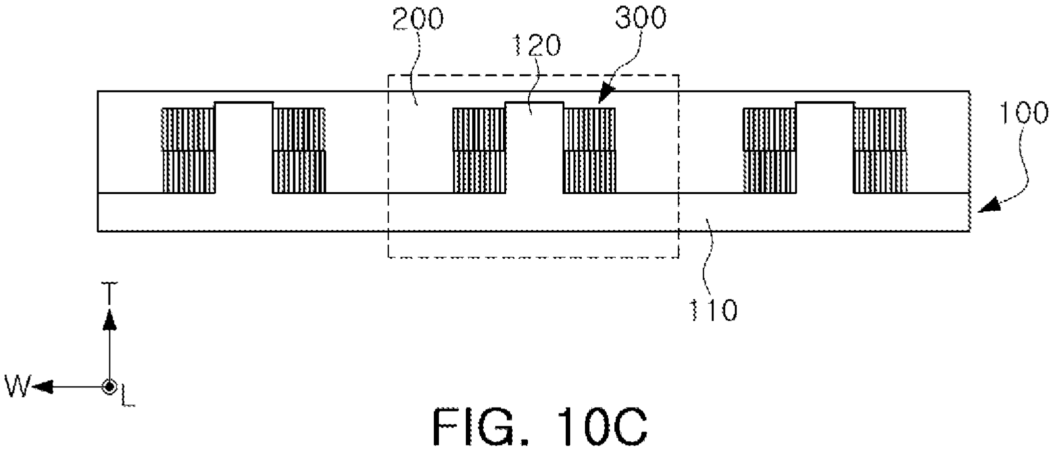

FIG. 9 is a side view illustrating that the coil component 1000 in FIG. 1 is mounted on the printed circuit board P, FIGS. 10A, 10B and 10C are views illustrating a first half sequence of a manufacturing process of the coil component in FIG. 1, and FIGS. 11A, 11B and 11C are views illustrating a second half sequence of the manufacturing process of the coil component in FIG. 1.

FIG. 9 is a side view illustrating that the coil component 1000 in FIG. 1 is mounted on the printed circuit board P.

Referring to FIG. 9, when the coil component 1000 is mounted on the printed circuit board P, the external electrodes 510 and 520 and the printed circuit board P may be bonded to each other and electrically connected to each other by the solder S. Here, it may be advantageous to have a large cross-sectional area of the external electrode 510 or 520 in contact with the solder S in order to improve bonding stability or reliability of the coil component. In the present disclosure, the first and second grooves 610 and 620 may be formed in the first and second external electrodes 510 and 520, and accordingly, the coil component 1000 may be prevented from being rotated when mounted on the printed circuit board P, and thus be mounted in the correct direction desired by a user. In addition, the solder S may be filled in the first and second grooves 610 and 620, thereby improving the bonding stability or reliability of the coil component.

FIGS. 10A, 10B and 10C and FIGS. 11A, 11B and 11C are views illustrating the sequence of the manufacturing process of the coil component 1000 in FIG. 1. This sequence of the process corresponds to one exemplary embodiment, and the coil component 1000 of the present disclosure may be manufactured by using another method.

For convenience, the drawings show that only three units are connected to one another. However, more coil components 1000 may be manufactured when the manufacturing process is cycled once as in this exemplary embodiment by using a flat magnetic sheet.

Referring to FIGS. 10A, 10B and 10C, an operation A (FIG. 10A) may include forming a magnetic sheet in which molded portions 100 each including a magnetic material are aligned. Each of the molded portions 100 may include a base portion 110 forming its bottom surface and a core 120 disposed at its center. The molded portion 100 may be formed by filling a mold for forming the molded portion 100 with the magnetic material, and applying high temperature and high pressure thereto. Alternatively, the molded portion 100 may be formed in a molding process of applying high temperature and high pressure to the magnetic composite sheet in which the magnetic materials are dispersed in an insulating resin by using the mold. The molded portion 100 may have a magnetic material filling rate higher than that of a cover portion 200.

An operation B (FIG. 10B) may include loading a plurality of wound coils 300 around each core 120. Here, each core 120 may have a pillar shape or a bump shape. The wound coil 300 may be loaded more easily when the core has the bump shape, compared to the case when the core has the pillar shape. Meanwhile, when the core has the pillar shape as in this exemplary embodiment, the molded portion 100 having a higher magnetic material filling rate may occupy a higher proportion in a body B, and the coil component may thus have the inductance characteristic more improved than the case in which the core 120 has the bump shape.

An operation C (FIG. 10C) may include forming the cover portion 200 by positioning the magnetic composite sheet, in which the magnetic materials are dispersed in the insulating resin, over the molded portion 100 and the wound coil 300, and then heating and pressing the same, and then embedding the wound coil 300 in the body B. Here, the cover portion 200 may have a magnetic material filling rate lower than that of the molded portion 100.

Figure 11A:
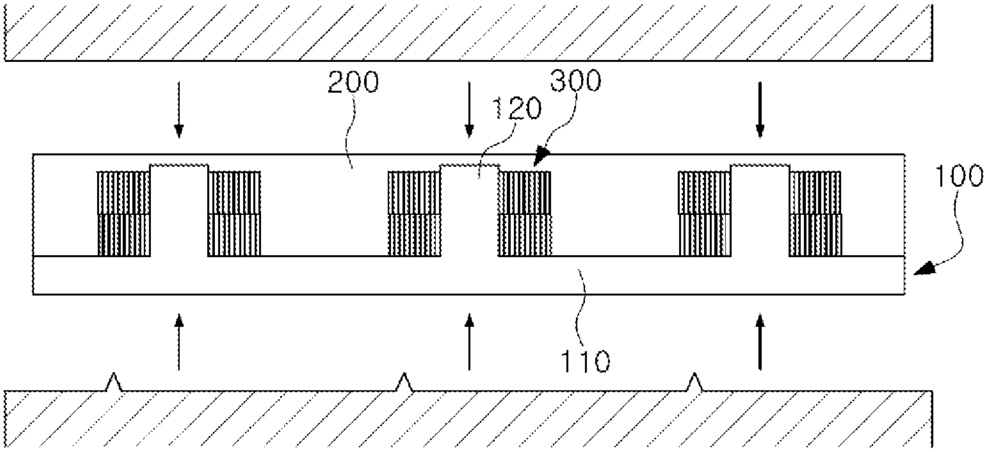
FIGS. 11A, 11B and 11C are views illustrating a second half sequence of the manufacturing process of the coil component in FIG. 1.
Figure 11B:
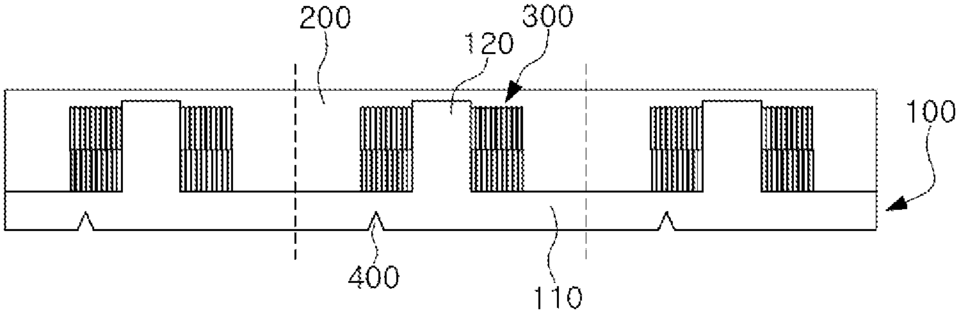
Figure 11C:
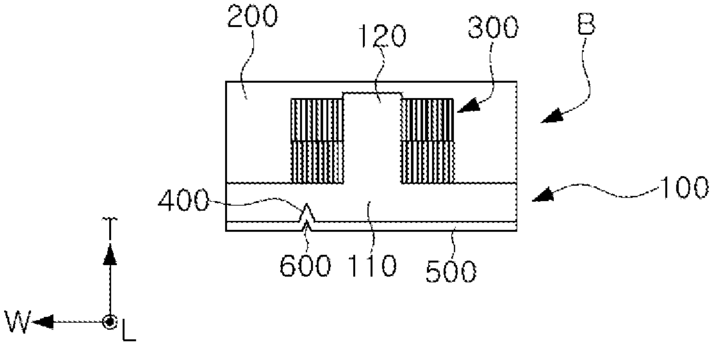

Referring to FIGS. 11A, 11B and 11C, in the operation A (FIG. 11A), an isostatic press may be applied for the pressure to act equally on the structure formed in FIG. 10C in all directions. Here, an upper mold may have a flat shape, and a lower mold may have a protrusion to form a recess portion 400 in the other surface of the molded portion 100. Alternatively, the recess portion 400 may be formed in the forming of the molded portion 100 (shown in FIG. 10A) or in the forming of the cover portion 200 (shown in FIG. 10C). However, the recess portion 400 may be deformed during the subsequent heating and pressing processes, and may be formed in the isostatic press operation, which is the final pressing operation.

In the operation B (FIG. 11B), the component formed in the operation A may be dried and cured, and then performed is a process of dicing the coil components 1000 into each unit along an aligned line between each wound coil 300.

In the operation C (FIG. 11C), processes such as polishing the unit formed in the operation B and printing an insulating layer and the like may be performed, and the external electrode 500 may then be disposed on a lower surface of the body B by vapor deposition and/or electroplating. Here, the external electrode 500 may be formed in the shape of the other surface of the base portion 110, the groove 600 may thus be formed in the external electrode 500 to correspond to the shape of a surface of the recess portion 400.

As set forth above, according to an exemplary embodiment of the present disclosure, even when the coil component is smaller and low-profile, it is possible to prevent the rotation of the coil component when the component is mounted on the printed circuit board and to increase the bonding strength between the coil component and the printed circuit board by increasing the area of the surface on which the component is mounted.

While exemplary embodiments have been shown and described above, it will be apparent to those skilled in the art that modifications and variations could be made without departing from the scope of the present disclosure as defined by the appended claims.

What is claimed is:

1. A coil component comprising:

a body including a molded portion having a first surface and a second surface opposing each other, and a cover portion disposed on the first surface of the molded portion;

a wound coil disposed between the molded portion and the cover portion in the body, and having first and second lead-out portions extending to one surface of the body while being spaced apart from each other;

a first recess portion disposed in the one surface of the body;

a first external electrode disposed on the one surface of the body to be connected to the first lead-out portion, and disposed along a surface of the first recess portion to have a first groove disposed therein; and a second external electrode disposed on the one surface of the body while being spaced apart from the first external electrode and connected to the second lead-out portion, wherein the first groove of the first external electrode is spaced apart from the wound coil and in contact with the body.

2. The coil component of claim 1, further comprising a second recess portion disposed in the one surface of the body, wherein the second external electrode is disposed along a surface of the second recess portion to have a second groove disposed therein.

3. The coil component of claim 2, wherein each of the first and second grooves has a shape of a straight line perpendicular to each of the first and second external electrodes disposed parallel to each other.

4. The coil component of claim 3, wherein the first or second groove has a cross-sectional area of its inner surface smaller than a cross-sectional area of its outer surface, based on a cross section parallel to the one surface of the body.

5. The coil component of claim 4, wherein the first or second groove has a cross section in a shape of an arc convex toward the first surface of the molded portion, based on a cross section perpendicular to the one surface of the body and parallel to the first or second external electrode.

6. The coil component of claim 2, wherein the first and second recess portions are disposed between a region of the one surface of the body, where the first and second lead-out portions are exposed and a region of the one surface of the body, where the second surface of the molded portion is exposed.

7. The coil component of claim 6, wherein the wound coil further includes a wound portion having at least one turn, and first and second bent portions respectively connecting the wound portion and the first and second lead-out portions to each other, and the first and second bent portions are respectively disposed above the first and second recess portions, in the body.

8. The coil component of claim 7, wherein an inclined surface close to each of the first and second lead-out portions among cross sections of the first and second recess portions, has an inclined direction coincident with a direction from one end of the first or second bent portion, connected to the wound portion, to the other end connected to the first or second lead-out portion, based on the cross section perpendicular to the one surface of the body and parallel to the first or second external electrode.

9. The coil component of claim 1, wherein the first recess portion is disposed between a region of the one surface of the body, where the first lead-out portion is exposed and a region of the one surface of the body, where the second surface of the molded portion is exposed.

10. The coil component of claim 1, wherein the wound coil further includes a wound portion having at least one turn, and first and second bent portions respectively connecting the wound portion and the first and second lead-out portions to each other, and the first and second bent portions are respectively disposed above the first and second recess portions, in the body.

11. The coil component of claim 10, wherein an inclined surface close to each of the first and second lead-out portions among cross sections of the first and second recess portions, has an inclined direction coincident with a direction from one end of the first or second bent portion, connected to the wound portion, to the other end connected to the first or second lead-out portion, based on the cross section perpendicular to the one surface of the body and parallel to the first or second external electrode.

12. The coil component of claim 10, wherein the molded portion includes a base portion having one surface and the other surface opposing each other, and a core disposed at a center of the one surface of the base portion and passing through the wound coil.

13. The coil component of claim 12, wherein the base portion includes:

a first receiving groove through which the first bent portion passes and in contact with the first external electrode, and a second receiving groove through which the second bent portion passes and in contact with the second external electrode.

14. The coil component of claim 13, wherein the same magnetic material as that of the cover portion is disposed in the first or second receiving groove.

15. The coil component of claim 1, wherein the first groove has a cross-sectional area of its inner surface smaller than a cross-sectional area of its outer surface, based on a cross section parallel to the one surface of the body.

16. The coil component of claim 15, wherein the first groove has a cross section in a shape of an arc convex toward the first surface of the molded portion, based on a cross section perpendicular to the one surface of the body and parallel to the first or second external electrode.

17. The coil component of claim 1, wherein each of the molded portion and the cover portion includes a magnetic material, and the molded portion has a magnetic material filling rate higher than that of the cover portion.

18. The coil component of claim 1, wherein the wound coil includes a conductive metal, and has the remainder covered with an insulating covering layer, except for a portion in contact with the first or second external electrode.

19. The coil component of claim 1, wherein the first recess is recessed in the cover portion.

20. A coil component comprising:

a body including a molded portion having a first surface and a second surface opposing each other, and a cover portion disposed on the first surface of the molded portion;

a wound coil disposed between the molded portion and the cover portion in the body, and having first and second lead-out portions extending to one surface of the body while being spaced apart from each other;

a first recess portion disposed in the one surface of the body;

a first external electrode disposed on the one surface of the body to be connected to the first lead-out portion, and disposed along a surface of the first recess portion to have a first groove disposed therein;

a second external electrode disposed on the one surface of the body while being spaced apart from the first external electrode and connected to the second lead-out portion, the second external electrode disposed along a surface of the second recess portion to have a second groove disposed therein; and a third recess portion positioned in an extension line in which the first recess portion and the second recess portion are connected to each other on the one surface of the body.

* * * * *